Nov. 25, 1930.  D. P. McLAUGHLIN  1,783,024
FLYING MACHINE
Filed April 22, 1929   6 Sheets-Sheet 4

Inventor
Daniel P. McLaughlin

Nov. 25, 1930.   D. P. McLAUGHLIN   1,783,024
FLYING MACHINE
Filed April 22, 1929   6 Sheets-Sheet 5
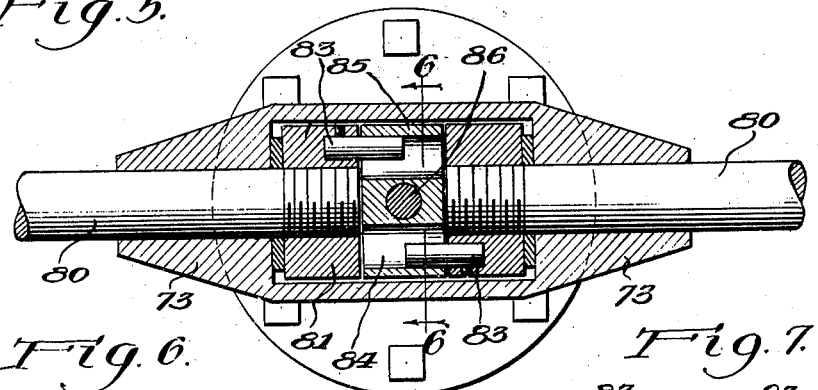
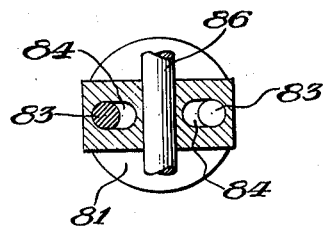
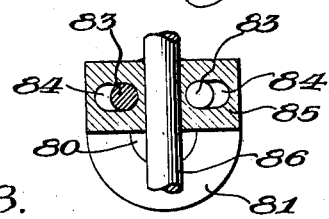
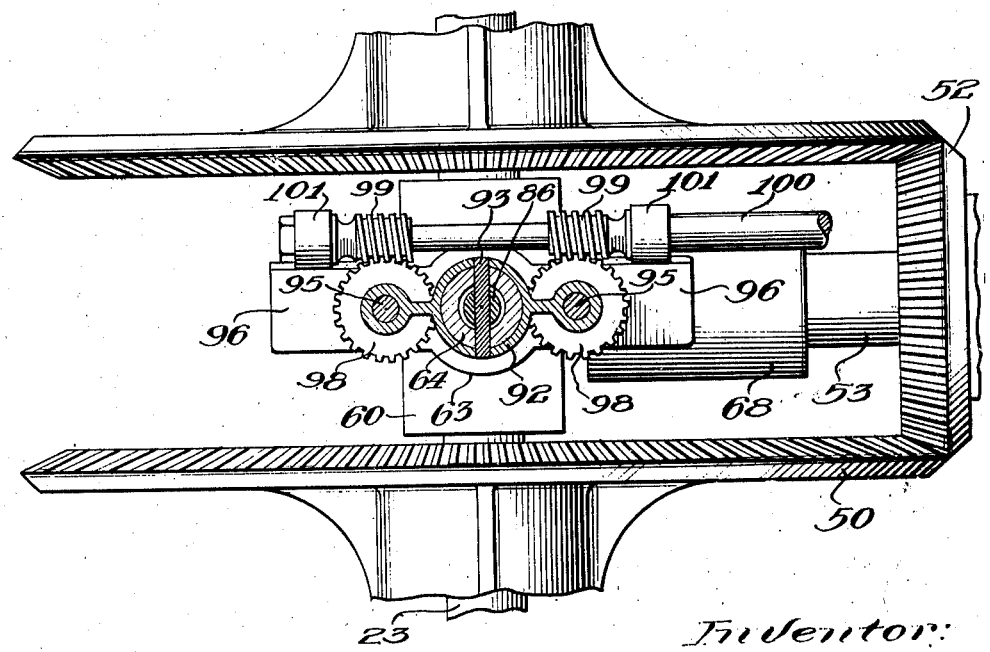
Inventor:
Daniel P. McLaughlin Nov. 25, 1930.  D. P. McLAUGHLIN  1,783,024
FLYING MACHINE
Filed April 22, 1929   6 Sheets-Sheet 6

Inventor:
Daniel P. McLaughlin

Patented Nov. 25, 1930

1,783,024

UNITED STATES PATENT OFFICE

DANIEL P. McLAUGHLIN, OF CHICAGO, ILLINOIS

FLYING MACHINE

Application filed April 22, 1929. Serial No. 356,957.

This invention relates to flying machines, and more particularly to an auxiliary mechanism provided for assisting the usual driving mechanism in driving and lifting the machine.

One of the main objects of this invention is to provide an auxiliary device or mechanism for producing auxiliary power, to be utilized in conjunction with the usual driving mechanism, for assisting the latter in propelling flying machines, land vehicles, boats, and similar movable bodies, and especially for assisting in lifting flying machines. Another object is to provide such an auxiliary power producing device comprising rotary mechanism including cylinders provided with means for producing atmospheric suction by the use of centrifugal force, to co-operate with the usual driving mechanism of a machine and assist in propelling the same. A further object is to provide such a device with cylinders arranged for producing atmospheric suction, and including means for holding all the cylinders so their axes extend in the same direction during rotation of the device, and also including means for readily adjusting the cylinders to change the direction of their axes in accordance with the direction of flight of the machine. A still further object is to provide such an auxiliary device for assisting a lifting propeller in lifting a flying machine, and to comprise means for adjusting the pitch of the propeller and for adjusting certain mechanism of the device, in accord with the direction of flight of the machine, and to aid in its propulsion, whether in an upwardly or in a forwardly direction. Still another object is to provide an auxiliary power producing device including rotary mechanism containing a series of cylindrical members, closed at the lower ends and open at the tops, and each having a freely movable piston therein, for producing atmospheric suction by the employment of centrifugal force, by rotation of said mechanism, to produce a lifting effect on a movable body.

These objects and other objects and advantages are attained with this invention, as will become apparent from the following description, taken in connection with the accompanying drawings, in which Fig. 1 is a side elevation of a flying machine, with parts broken away, showing my invention applied thereto.

Fig. 5 is a horizontal detail section on line 5—5 of Fig. 4.

Fig. 6 is a vertical detail section on line 6—6 of Fig. 5.

Fig. 7 shows a section similar to Fig. 6, but with the means for adjusting the pitch of the propeller differently positioned.

Fig. 8 is a horizontal sectional view, taken on line 8—8 of Fig. 4.

Figure 1:
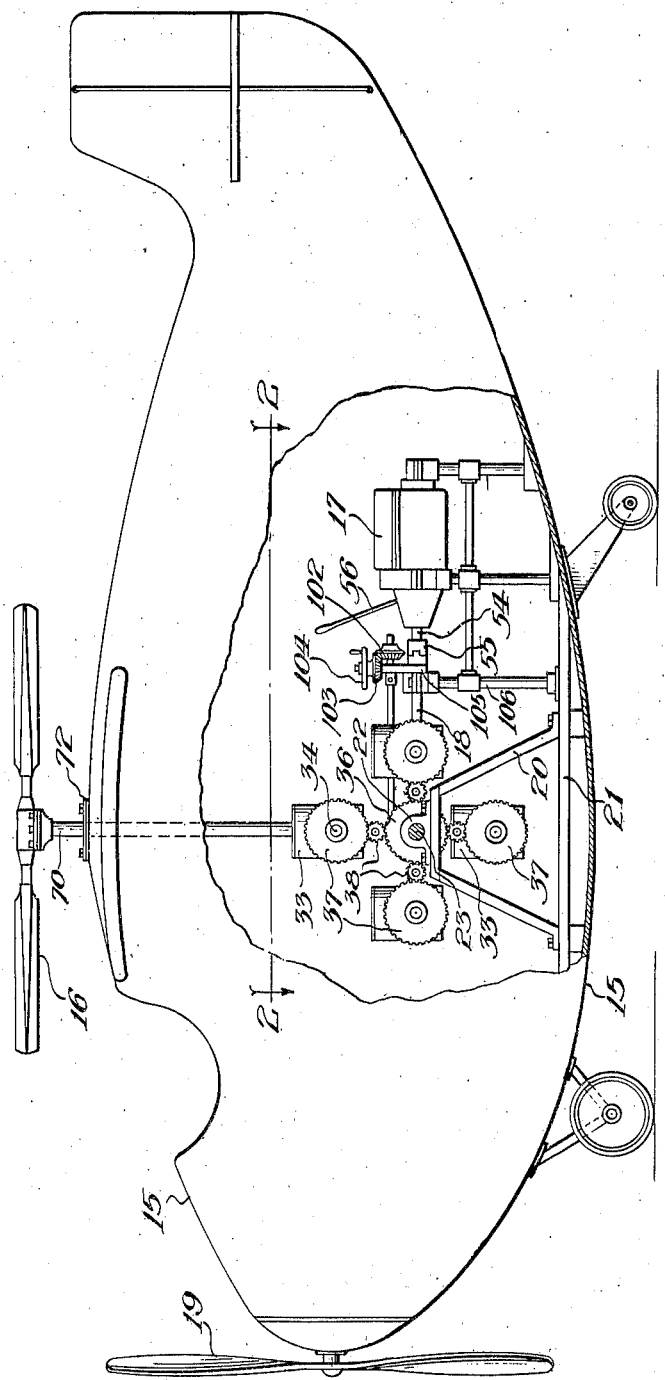

This invention is an improvement over my former invention disclosed in United States Letters Patent No. 991,794, granted to me May 9, 1911, on flying machine or airship.

Heretofore numerous attempts have been made to construct a practical device for lifting a machine vertically in the air, but such attempts have failed, for the reason that entire dependence was placed on the ability of the weight of the machine to serve as a fulcrum for the production of power to lift said machine in direct opposition to gravity, and naturally such devices only produced a limited and insufficient amount of power.

My present invention does not use the weight of the machine to produce lifting power, but derives its power from a different source; and consequently this enables it to assist a propeller or other devices that depend on the weight of the machine for their ability to produce power for lifting and propelling the machine.

By employing centrifugal force and using suitable mechanism, this invention is able to drive pistons against the atmosphere, thereby uncovering the natural pressure of the latter and causing a suction. This suction may in this invention be produced in any direction desired, and as its lifting power will approximately equal the lifting power of a propeller, then it may be seen that by combining this invention with a propeller, an increased amount of lifting power will be produced; thus making it possible to produce sufficient power to lift a machine vertically in the air, and to operate it in any direction.

In utilizing my invention for operating land vehicles, boats, and similar horizontally movable bodies, it will produce a suction equal to their resistance to movement, and will thus assist their present driving mechanism and enable the same to operate at a big saving of power.

An embodiment of my invention is illustrated in the drawings in connection with a flying machine or aeroplane 15 which is provided with a helicopter or lifting propeller 16, for lifting or propelling the machine upwards, and an engine or power supplying means 17 which is connected to said propeller by means of suitable driving connections 18 for operating it. The machine also includes a tractor propeller 19, which may be driven by any suitable and customary power supplying means for propelling the machine forwardly, in the usual way.

This invention, as applied to the disclosed type of flying machine, comprises an auxiliary device which is used in co-operation with the propelling means on the machine, for augmenting the power provided by said propelling means for lifting and driving the machine, and this device is preferably interposed in the driving connections 18 which is provided between the engine 17 and the lifting propeller 16, being thus drivable by said engine in combination with said propeller.

The auxiliary device illustrated comprises standards 20 which are bolted or secured upon a base 21 mounted in the flying machine 15, and these standards have bearing boxes 22 at the upper ends, wherein is journaled the main shaft 23 which is held in position by a worm wheel 24 secured on one end of the shaft and driven by a worm or threads provided on a shaft 25 journaled in bracket means 26 mounted on the standards. This shaft 25 has a hand wheel 27 thereon for turning it and the worm wheel 24, to provide convenient adjustment for the main shaft 23 with the mechanism mounted thereon.

Figure 2:
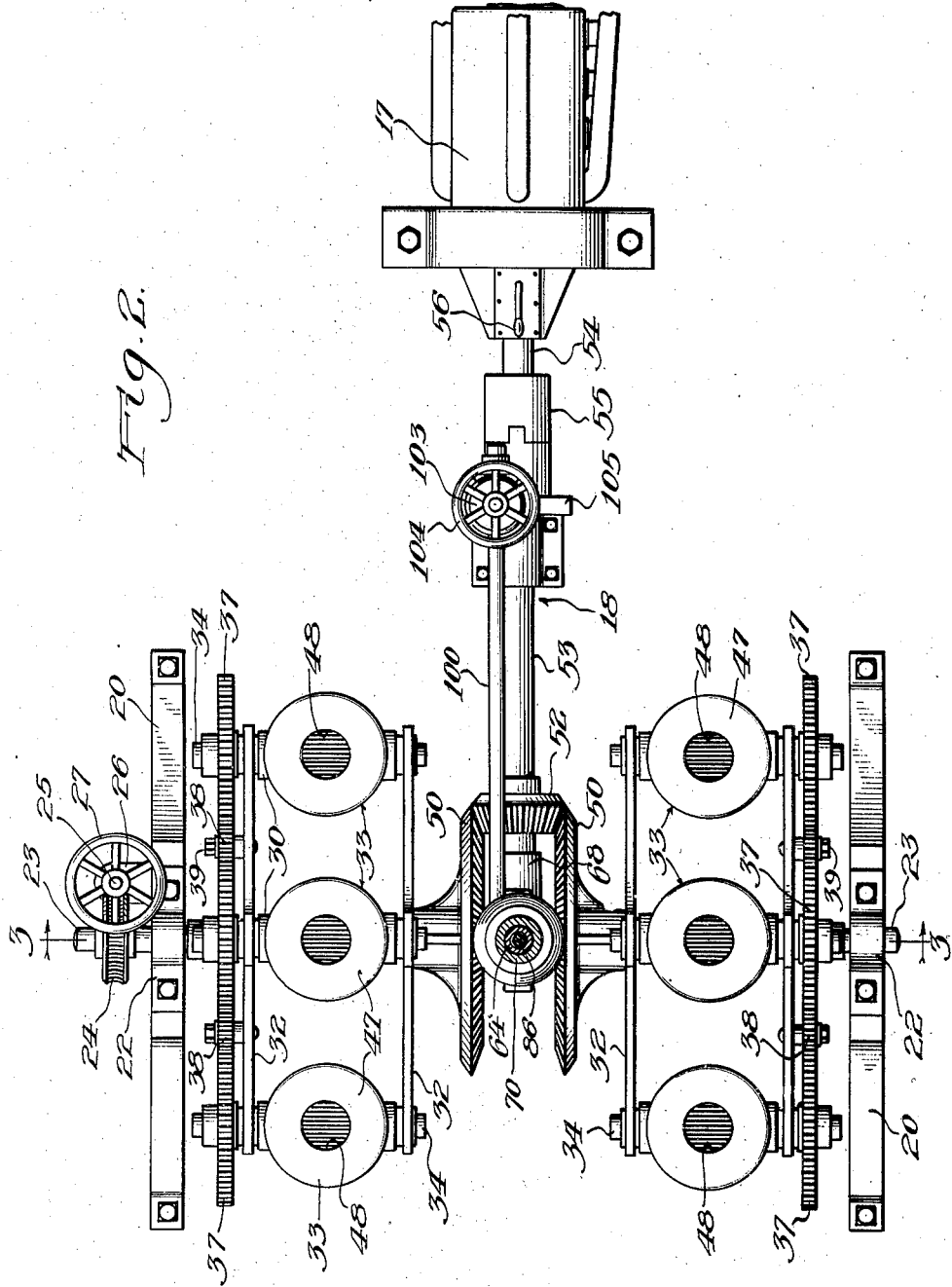
Fig. 2 is an enlarged horizontal sectional view of my invention, taken on line 2—2 of Fig. 1.
Figure 3:
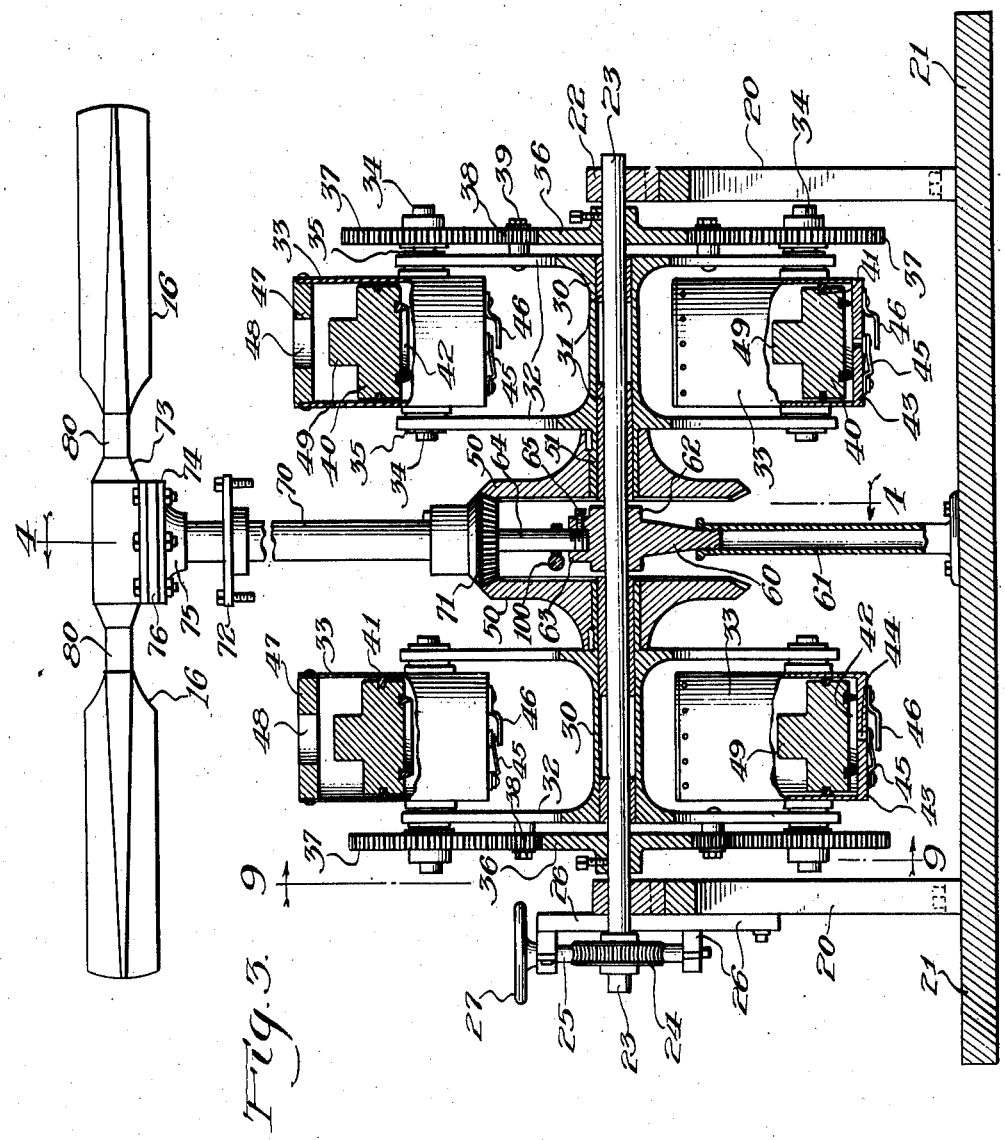
Fig. 3 is a vertical cross-sectional view, taken on line 3—3 of Fig. 2.
Figure 9:
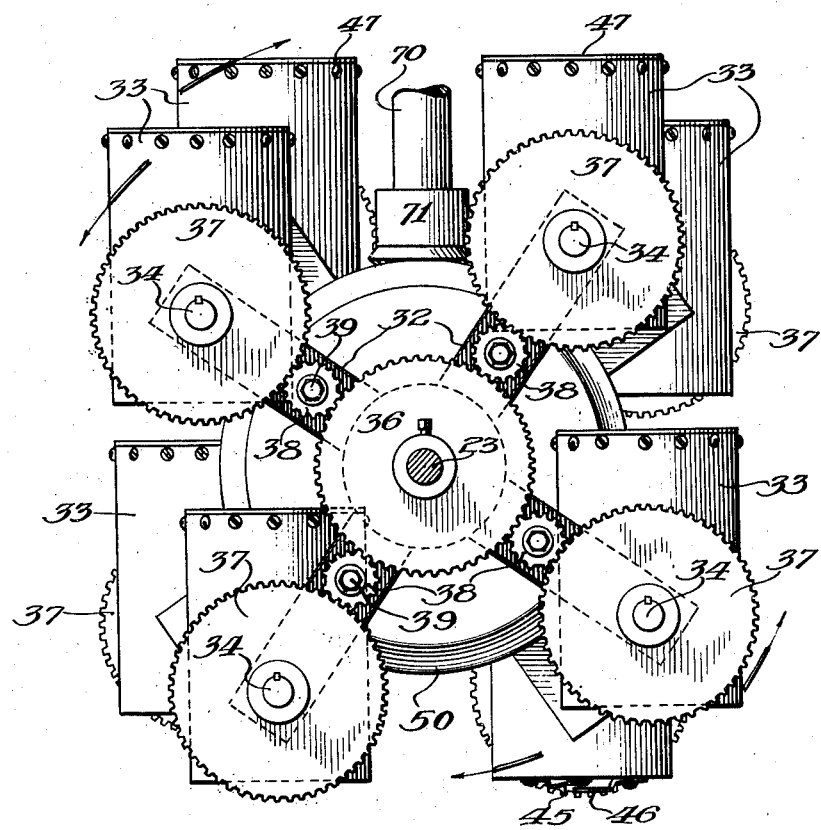
Fig. 9 is a side elevation of the rotary mechanism of this invention, provided as a pair, and one movable in a direction reverse to the other.
Figure 10:
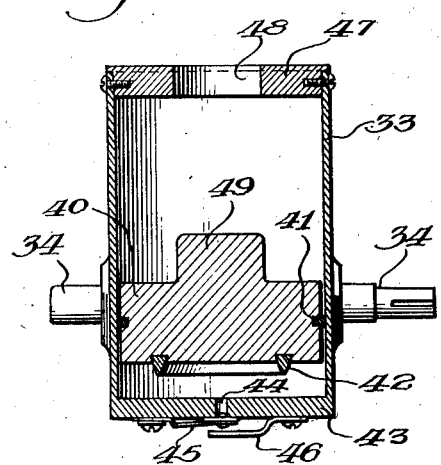
Fig. 10 is a vertical sectional view, taken centrally through a cylindrical member of the rotary mechanism.
Figure 11:
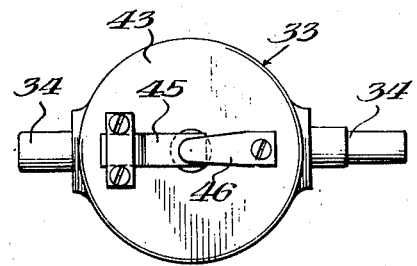
Fig. 11 is an inverted plan view of a cylinder.

The rotary mechanism provided for producing atmospheric suction, by employing centrifugal force, comprises one or more rotary means and preferably comprises a pair thereof, one on each side of the middle part of said main shaft 23, as best shown in Figs. 2 and 3, and which rotate oppositely, as indicated by the arrows in Fig. 9, to provide a balanced construction. Each rotary means of this pair contains a hub 30, journaled with bushings 31 on shaft 23, and arms 32 extend radially outwards from each end of this hub. The opposite arms on each hub are arranged in pairs, and a cylinder or cylindrical member 33 has a pair of trunnions 34 which are journaled in bushings 35 provided at the ends of said arms.

Means is provided for holding all the cylinders 33 so that their axes will extend in the same direction or be placed parallel to each other, and to provide for conveniently adjusting said cylinders and tilting of their axes. This means comprises a pair of central gears 36 secured on the ends of shaft 23, inside of standards 20, and similar sized gears 37, one secured on the outer trunnion 34 of each cylinder 33, also an idler pinion 38 mounted with a shaft 39 on an arm 32, between each gear 37 and the central gear 36, to produce simultaneous and similar rotary movement of all of said gears 37 and their cylinders 33 during their rotation around central gear 36 and shaft 23 which is held stationary but adjustable by worm wheel 24 and shaft 25. Each gear 37 with its cylinder 33 thus rotates once while hub 30 with its arms 32 make one rotation, thereby carrying the cylinders with their axes extending in the selected direction.

Each cylinder is provided with a piston or disk-like member 40 which is freely slidable therein, and has no piston stem or other mechanical connection with the machine to control or retard its free movement in the cylinder. A suitable packing ring 41 surrounds the piston, to provide a substantially airtight fit in the cylinder. A resilient ring 42 is mounted in an annular groove in the lower face of the piston and projects below the same for engaging the bottom wall 43 of the cylinder, and serves as a cushion for the piston on its return stroke. This ring also serves to retain a small quantity of air below it in the lower end of the cylinder, which expands during the subsequent upward movement of the piston, thereby making it possible to operate the piston at less than atmospheric pressure. An air vent 44 is preferably provided in said bottom wall 43, and has a flap valve 45 and a stop finger 46 mounted on its under face, to enable the piston to expel air that may leak past packing ring 41 into the closed lower end of the cylinder; so as to retain a small and substantially uniform quantity of air below the piston, in view of said ring 42; and this retained air beneath the piston, in co-operation with the centrifugal force produced by the rotation of the cylinders and pistons therein, enables the pistons to move a certain distance outwardly in the cylinders during the operation of this mechanism.

Each cylinder is provided with a safety ring or stop member 47 secured in its upper end, and it contains a central opening or bore 48 wherein is receivable a lug or extension 49 provided on top of the piston. If the piston should accidentally be given too much force and outward movement, during rapid rotation of the mechanism, then this safety ring 47 will stop it. When the pistons are thus thrown too far outwards, these extensions 49 thereon will enter the bores 48 of these rings; thereby preventing the further escape of air, and by compressing the remainder of air therein, will cushion the pistons at the upper ends of the cylinders.

The means provided herein for operatively connecting my auxiliary device with the driving engine 17, and preferably for interposing it in the driving connection 18 between said engine 17 and the lifting propeller 16, comprises a pair of bevel gears 50, each keyed or secured to the inwardly extending sleeve part 51 of one of the hubs 30. A bevel pinion 52 secured on a drive shaft 53 engages both of said gears, and rotates the one and its attached rotary means in a direction reverse to the other and the attached rotary means, as best indicated by the arrows in Fig. 9. An engine shaft 54 and suitable clutch means 55 is provided for connecting and disconnecting the engine 17 with the shaft 53 of the driving connections 18; and an engine lever 56 is provided on the engine.

Figure 4:
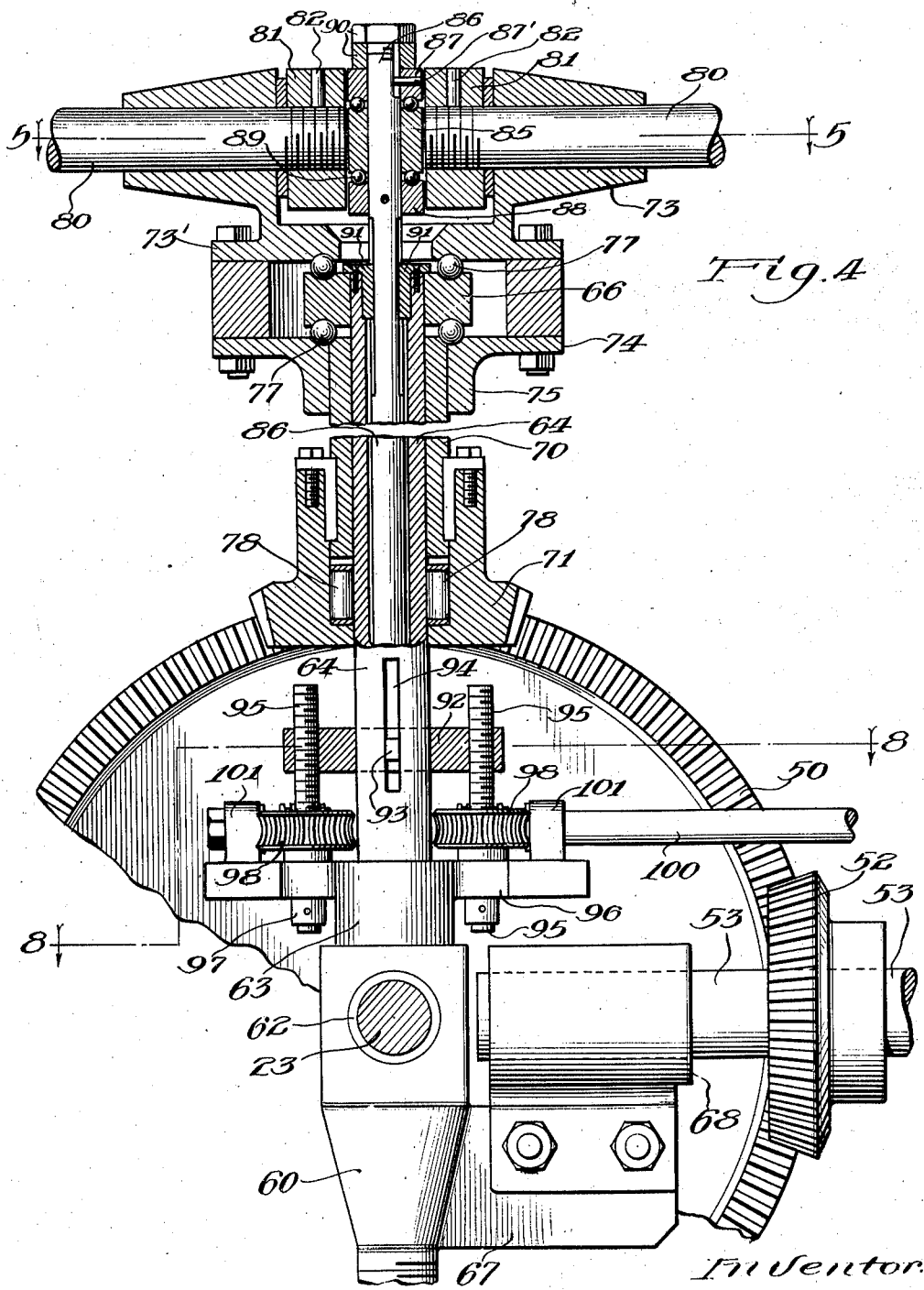
Fig. 4 is an enlarged vertical sectional view, taken on line 4—4 of Fig. 3.

The means for mounting the helicopter or lifting propeller 16 on the machine and for operating it comprises a casting 60 which is secured in a tubular support 61 bolted or secured to base 21 in the machine. This casting contains a bearing 62 with a bore therein wherein the main shaft 23 is turnable. It also contains a tapped socket portion 63 at its top, wherein is threaded the lower end of a tubular member or tube 64, locked in position by a set screw 65; and on the top of this tube is secured a bearing ring or collar 66, preferably by welding it thereon. Said casting 60 also has an arm 67 thereon to which is secured a bearing 68 for rotatably supporting the inner end of drive shaft 53, as best shown in Fig. 4.

A rotatable tubular member or sleeve 70 is mounted to rotate around the stationary tube 64, and has a bevel pinion 71 secured to its lower end to mesh with the pair of bevel gears 50. A collar 72 secured on top of the flying machine surrounds said sleeve to support its upper part rotatably. On the top of said sleeve is mounted a housing 73 containing at its lower part a casing 74 which is formed by a flanged collar 75, welded or secured to the top end of said sleeve, and by a spacing ring 76, placed between said collar and the lower flange 73' of the housing. Said casing surrounds bearing ring 66 at the top of tube 64, being rotatably mounted thereon with anti-friction bearing means, as balls 77 movable in suitable ball-races, as shown in Fig. 4.

Suitable bearing means 78, such as rollers, are provided at the lower end of sleeve 70. The same are placed in the sleeve portion of bevel pinion 71, around the enclosed tube 64, as best shown in Fig. 4.

The lifting propeller 16 is constructed and provided with means so as to enable convenient adjustment of its pitch, or tilting of its propeller vanes; and it therefore includes separately movable propeller shafts 80, each carrying a propeller vane and being journaled in a horizontal bore provided in housing 73. On the inner end of each shaft is threaded an operating nut 81 locked thereon by a set screw 82; and, as best shown in Fig. 5, each nut has a pin 83 extending inwardly therefrom into a slot 84 provided in each side of an operating block or lever block 85 which is mounted to rotate around an operating shaft 86 that extends slidably upwards through tube 64.

Anti-friction bearing means is provided in which the block 85 rotates, and this includes an upper bearing collar 87 and a lower bearing collar 88, and balls or rotary elements 89 in suitable ball-races provided in the meeting faces of said collars and the block. Said collar 88 is pinned or secured to said shaft 86, and said collar 87 is held against turning on said shaft by a pin 87', as shown in Fig. 4; while suitable locking means, like nuts 90, are placed at the top of shaft 86, to hold said bearing means and the block in the proper position on said shaft. This provides rotation of said block with the propeller shafts 80 around operating shaft 86, but enables movement of said block upwards and downwards along with said shaft 86, relative to the propeller shafts 80 and their attached nuts 81 with pins 83; whereby said pins are caused to slide laterally in slots 84 in said block, as indicated in Figs. 6 and 7, and these operating nuts 81 with shafts 80 and the vanes thereon are turned or tilted to adjust the pitch of these propeller vanes as desired. Keys 91 are set in companion key slots cut in shaft 86 and in tube 64, to prevent twisting of said shaft in said tube but permit it to slide therein.

The means for conveniently actuating the operating shaft 86 and adjusting the pitch of the propeller, as indicated in Figs. 2, 4, and 8, comprises a yoke 92 connected with said shaft 86, by means of a pin 93 which is positioned firmly in said yoke and in said shaft, but is slidable in a slot 94 provided in tube 64. This yoke is tapped and has screws 95 threaded therein which are journaled in arms or extensions 96 provided on casting 63, and which are held against upward movement in said arms by means of collars or bands 97 secured to the lower ends of these screws. Worm wheels 98 are secured on said screws and are actuated by worms or threads 99 provided on an operating rod 100, for turning said wheels and screws to raise and lower said yoke and the operating shaft 86 thereby. Said rod is journaled in bearing means 101 provided on arms 96; and, as seen from Figs. 1 and 2, this rod is turned by means of a bevel pinion 102 secured thereon and actuated by a bevel pinion 103 secured to a hand wheel 104 mounted on a bracket 105 provided on the supporting frame 106 which also supports the engine 17. These members thus provide means for conveniently operating said rod 100 and the operating shaft 86, for adjusting the pitch of the propeller.

It may be observed from the above disclosure that in a flying machine equipped with my invention the pitch of the propeller vanes or blades may be readily increased or decreased by manipulation of the hand wheel 104; and that said pitch may be adjusted or regulated to cause the machine to be lifted upwards, or to remain stationary in the air, or to be lowered slowly to the ground. It may also be observed that these vanes or blades may be adjusted or set so as to be held horizontally or flat; thereby preventing them from lifting the machine upwards when it is being propelled horizontally on its planes by the operation of the tractor propeller 19. It is further apparent that by manipulation of hand wheel 27 the cylinders may be faced forwardly, so as to assist the tractor propeller 19 in propelling the machine horizontally forwards.

It should also be noted that in my invention the pistons are not mechanically connected or held by the machine, but are freely slidable in the cylinders, and I am thus enabled to utilize the atmospheric pressure as a force exterior to the machine, consequently the pressure of the atmosphere and the speed of rotation of my rotary mechanism are used to regulate the length of stroke of the pistons in the cylinders. This regulation is obtained by fixing a maximum speed at which my mechanism with its radial arms may be rotated. This speed will not develop quite as much centrifugal force to the square inch of piston surface as the atmospheric pressure; consequently the pressure of the atmosphere will stop the pistons in their outward travel after they have produced a partial vacuum in the cylinders, equal to the amount of force said pistons possess; and the small quantity of air retained in the cylinders below the pistons enables the pistons to operate at less than atmospheric pressure.

It is further apparent that the cylinders are mounted so that their axes all extend parallel and in a certain selected position, as adjusted by manipulation of the hand wheel 27, as indicated in Figs. 3 and 9, where my mechanism is shown while operating in lifting the machine vertically in the air. Since the cylinders are held to point constantly in the direction of travel of the machine, the pistons can only move back and forth in line with this direction, and consequently the pistons will remain in the bottom of the cylinders until the latter start across the top arc of their circular path of travel. This change from the upward movement of the cylinders toward the downward course causes the pistons to shoot upwards in said cylinders, thereby producing a partial vacuum therein, equal in suction power to the weight of the machine; and as the pistons are not mechanically connected to the machine, the pressure of the outer atmosphere on the pistons has no effect on the movement of the machine; consequently as the pressure of the air on the closed lower ends of the cylinders is equivalent to the weight of the machine, it tends to sustain the machine, thereby reducing the pull of gravity on the machine fifty per cent.

The centrifugal force present in the pistons, during rotation of the mechanism, prevents reaction from the atmospheric pressure until the cylinders move downwards beyond the top point of their circular course, and while thus prolonging their lifting power they act as fulcrums for the succeeding pistons and enable them to lift directly on the machine through the angular slant of the radial arms. By revolving the two sets of cylinders in opposite directions it tends to prevent reaction of the operating pistons against the driving power and also directs the lift toward a central point. The centrifugal force and the changing positions of the cylinders, as they are revolving around their axial shaft 23, causes the pistons to automatically operate against the air, thereby making it possible to operate the flying machine with a small amount of power.

It will be readily understood that when a propeller has the capacity to transform the entire weight of the machine into atmospheric lifting power, then the addition of more propellers will not increase the volume of power produced, consequently to increase said volume it is necessary to produce such increase from a different power source. As this invention produces its auxiliary power from a different source than the usual one, it has the ability to increase the volume of power produced by the propeller in the usual way; wherefrom it may be seen that by utilizing this invention in co-operation with a propeller, the combined power produced thereby will be sufficient to lift a flying machine vertically in the air, and can operate it in any desired direction.

What I claim as my invention and desire to secure by Letters Patent is:

1. In a body having means for propelling it, an auxiliary device comprising rotary mechanism including freely movable means for producing atmospheric suction by employing centrifugal force, to co-operate with said propelling means in moving said body.

2. In a body having means for propelling it, an auxiliary device comprising rotary mechanism including cylindrical means having freely movable means therein for producing atmospheric suction, to co-operate with said propelling means in moving said body.

3. A device for propelling a body, comprising rotary mechanism including cylindrical means connected to said body and having the top open and the bottom closed and containing valve means thereon, and piston means operated by centrifugal force in said cylindrical means for producing a partial vacuum in the latter, to cause the outer atmosphere to exert its natural pressure against said closed bottom for producing a lifting effect on said body.

4. A device for use in propelling a body, comprising rotary mechanism mounted on said body and including cylindrical means having piston means freely and automatically movable therein by the rotation of said mechanism, for creating atmospheric suction to move said body.

5. In a flying machine, an auxiliary propelling mechanism including rotary means having cylindrical means open at one end and closed at the other, and piston means freely and automatically movable in said cylindrical means by rotation of said rotary means, to create a partial vacuum for aiding in propelling said machine.

6. In a flying machine, an auxiliary propelling device comprising rotary means including cylindrical means open at the top, piston means in the latter to move automatically therein by the rotation of said rotary means for creating a partial vacuum to aid in moving said machine, and means for adjustably holding said open tops to extend in the direction of travel of the machine.

7. A device for propelling a body, comprising rotary means having cylinders open at one end, piston means freely movable therein to create a partial vacuum, and means for retaining said cylinders to have their open ends constantly turned in a selected direction.

8. A device for propelling a body, comprising rotary means mounted on the body and having cylindrical means pivotally mounted thereon, means freely movable therein for creating atmospheric suction by employing centrifugal force, means for holding said cylindrical means to constantly extend in the same direction, and means for adjusting said holding means and cylindrical means to accord with the direction of travel of the body.

9. In a flying machine having propelling means, an auxiliary device comprising rotary means having cylindrical members pivotally mounted therein, means freely movable therein for creating atmospheric suction by the use of centrifugal force, means for holding said cylindrical members to have their longitudinal axes parallel, and means for readily regulating said holding means to have said axes of the members constantly directed in the direction of travel of the machine.

10. In a flying machine having propelling means and a driving engine therefor, an auxiliary device mounted in the machine and operated by said driving engine to co-operate with said propelling means in operating said machine, said device comprising cylindrical means open at one end and having piston means therein operated by centrifugal force to produce a partial vacuum in said cylindrical means for aiding in propelling said machine.

11. In a flying machine having propelling means and an engine to drive it for lifting the machine, an auxiliary device on the machine and drivable by said engine, said device comprising a rotary mechanism having cylindrical means open at one end and closed at the other, and piston means operated by centrifugal force in said cylindrical means to produce a partial vacuum in the latter and cause the atmosphere to exert pressure against the closed end thereof during rotation of said mechanism, for aiding said propeller in lifting said machine.

12. In a flying machine having propelling means and an engine for driving it, an auxiliary device comprising rotary means having cylindrical members pivotally mounted therein, a freely movable piston in each member to create suction in the latter by the use of centrifugal force, and means for adjustably holding said members in accordance with the direction of travel of the machine.

13. In a flying machine having a propeller and an engine for driving it, an auxiliary device comprising a rotary mechanism also driven by said engine and including a pair of oppositely rotating means each carrying a series of cylindrical members trunnioned therein and being open at the top, piston means in each member to move freely and automatically therein by the rotation of said mechanism for creating atmospheric suction to aid in propelling said machine, and means for adjustably holding said members to have their open tops extend in the direction of travel of the machine.

14. In a flying machine having a propeller and an engine for driving it, an auxiliary device and driving means for driving said device and said propeller by said engine, said means and device including a driving member and a pair of oppositely rotating gears driven thereby and carrying a shaft, means connected to each gear to rotate therewith on said shaft, cylindrical means trunnioned in each rotary means and having open tops and closed bottoms, piston means freely slidable in said cylindrical means by rotation of said gears to create partial vacuum in the cylindrical means, means on said shaft to hold said cylindrical means to have their open ends constantly turned in the selected direction, and means for readily adjusting said shaft to direct said open ends in the particular direction of travel of the machine.

15. In a flying machine, a lifting propeller and means for adjusting its pitch, an auxiliary device comprising rotary means including cylindrical means with freely movable piston means therein for creating atmospheric suction during rotation of said rotary means, means for retaining said cylindrical means to have their axes extend in a selected direction, and means for adjusting said retaining means and cylindrical means in accordance to the direction of flight of the machine and in harmony with the adjustment of the pitch of the propeller.

16. In a flying machine, a tractor propeller, a lifting propeller having vanes which are adjustable for pitch, an auxiliary device comprising rotary means having cylindrical means adjustably mounted therein and containing means for producing atmospheric suction automatically by rotation of said rotary means, and means for adjusting said cylindrical means and for adjusting said vanes, to hold said vanes tilted for lifting the machine in co-operation with the adjusted device, or to hold said vanes flat during operation of said tractor propeller while the machine travels forward.

17. In a flying machine, a rotary mechanism comprising hub means and arms extending radially therefrom, cylinders journaled in the outer ends of said arms, a piston movable in each cylinder and having no mechanical connection with said rotary mechanism but being held in said cylinders by atmospheric pressure, a shaft on which said hub means and arms rotate with said cylinders, and gears connecting said cylinders with said shaft for changing the bodily positions of said cylinders in said arms during rotation of said mechanism, whereby centrifugal force is produced in the pistons causing them to operate automatically and produce atmospheric suction in the cylinders, for assisting in lifting and driving the machine.

18. In a flying machine having a propeller, an auxiliary device comprising rotary mechanism including cylinders having open tops, a piston in each cylinder to be freely movable therein by the rotation of said mechanism for creating suction, and means for retaining a small quantity of air below the piston in the cylinder to expand on the outward stroke and to enable the piston to operate at less than atmospheric pressure.

19. In a flying machine having a propeller, an auxiliary device comprising rotary means including cylinders journaled therein and having open tops and closed bottoms with valve means therein, and a piston in each cylinder to be freely movable therein by rotation of said means for creating suction and having a cushioning ring thereunder to retain a small quantity of air therebelow in the cylinder to expand on the subsequent upward movement of said piston.

20. In a flying machine, a lifting propeller having vanes which are adjustable for pitch, a tube for supporting said propeller, a sleeve and gear means for driving said sleeve and the propeller, a shaft in said tube and means thereon for adjusting said vanes to retain them either tilted or flat, rotary means connected to said gear means and containing adjustable cylinders having freely movable means therein for creating atmospheric suction automatically by rotation of said rotary means, and means for adjusting said cylinders and for adjusting said vanes, whereby to hold the vanes tilted for lifting the machine in co-operation with said rotary means or to hold said vanes flat for forward movement or for descent of the machine.

21. In a flying machine, a tractor propeller, a lifting propeller having vanes which are adjustable for pitch, an auxiliary device comprising rotary means having cylinders journaled therein which contain means therein for creating atmospheric suction automatically by rotation of said means, means for changing the bodily position of each cylinder during such rotation of said means to retain the longitudinal axes of said cylinders all in a selected direction, means for adjusting the last said means and the cylinders to adjust their axes in accordance with the direction of flight of the machine, and means for adjusting the pitch of said vanes according to the direction of flight of the machine or for the descent thereof.

22. An auxiliary propelling device comprising a shaft, means rotatable thereon and having arms extending radially outward, a cylinder journaled in the outer ends of each two arms, a piston freely movable in each cylinder and being free from any mechanical connection with said rotary means, to create atmospheric suction in the cylinder by rotation of said means, gears connecting said cylinders with said shaft for retaining their longitudinal axes in a selected direction, and manual means for readily adjusting said shaft to direct said axes in the direction of movement of the body which is to be propelled.

In testimony whereof I have signed my name to this specification.

DANIEL P. McLAUGHLIN.